United States Patent [19]

Paoluccio

[11] Patent Number: 4,541,363
[45] Date of Patent: Sep. 17, 1985

[54] LIQUID DISPENSING APPARATUS

[76] Inventor: John A. Paoluccio, 3530 Kiernan Ave., Modesto, Calif. 95356

[21] Appl. No.: 612,260

[22] Filed: May 21, 1984

[51] Int. Cl.⁴ .............................................. A01K 39/02
[52] U.S. Cl. ....................................................... 119/77
[58] Field of Search ................... 119/77, 18; 222/457, 222/588

[56] References Cited

U.S. PATENT DOCUMENTS

| | | | |
|---|---|---|---|
| 586,010 | 7/1897 | Burland | 222/457 |
| 768,522 | 8/1904 | Davenport | 222/588 |
| 798,493 | 8/1905 | Brown | 119/77 |
| 1,196,645 | 8/1916 | Bengue | 222/588 |
| 1,227,366 | 5/1917 | Bazinet | 119/77 |
| 1,450,494 | 4/1923 | Eummelen | 119/18 |
| 1,922,612 | 8/1933 | Barker | 119/77 |
| 3,301,220 | 1/1967 | Queen | 119/77 |

Primary Examiner—Hugh R. Chamblee
Attorney, Agent, or Firm—Robert S. Smith

[57] ABSTRACT

A liquid dispensing apparatus for cooperation with an associated liquid reservoir which includes a first fluid conduit extending into the associated liquid reservoir and a second fluid being disposed at a higher elevation than the first fluid conduit.

6 Claims, 3 Drawing Figures

LIQUID DISPENSING APPARATUS

BACKGROUND OF THE INVENTION

The invention relates to liquid dispensing apparatus such as watering devices for providing drinking water for birds, small mammals, dogs, cats, chickens, plants and the like. Numerous other applications will be apparent to those skilled in the art. Although the description will be described in terms of water dispensing apparatus, it will be understood to also have application to dispensing of other liquids.

The prior art includes a number of devices using a single conduit extending from a reservoir to a location where the liquid is used. Such devices are shown in U.S. Pat. Nos. 4,148,155; 180,242; 1,564,350; 662,990; 516,637; 294,932; 198,744; 975,607; 1,059,142; 1,042,240; 4,192,256; and 614,238.

Such devices have not been wholly satisfactory, in part, because they are not reliable. Other devices tend to be expensive, bulky, hard to clean, adjust and repair as well as limited in size, shape, and volume. Some have a high evaporation rate and therefore the water supply does not last long. Known devices with a water seal to close off continuing flow require the air flow which replaces the displaced water to travel through the same fluid conduit opening as the water flow, but in the opposite direction. This rarely works well on small watering devices because surface tension prevents water flow. A further problem with this opposite flow is that any surface contaminates tend to enter the reservoir.

It is an object of the invention to provide simple, reliable apparatus for dispensing a liquid.

It is another object of the invention to provide apparatus which is very inexpensive to manufacture.

SUMMARY OF THE INVENTION

The foregoing objects and other objects and advantages which shall become apparent from the detailed description of the preferred embodiment are attained in a liquid dispensing apparatus for cooperation with an associated liquid reservoir which includes a first fluid conduit extending into the associated liquid reservoir and a second fluid being disposed at a higher elevation than the first fluid conduit. The fluid conduit may extend from the associated liquid reservoir to a concave chamber having an open upper face and means may be provided to limit the flow out of the second conduit. The open upper face is disposed at a higher elevation than the highest elevation of the first fluid conduit. The concave chamber may have a depending member extending from the periphery thereof into the concave chamber. The concave chamber may extend to an elevation lower than the highest elevation of the first fluid conduit and may extend to an elevation higher than the highest elevation of the first fluid conduit. The elevation of the lowest extremity of the depending member may be intermediate the highest elevation of the first fluid conduit and the lowest elevation of the first fluid conduit.

BRIEF DESCRIPTION OF THE ACCOMPANYING DRAWING

The invention will better be understood by reference to the accompanying drawing in which.

DESCRIPTION OF THE PREFERRED EMBODIMENT

The physical principles involved are known, however, the illustrative science experiments are easily forgotten. For example, it is known that if a glass of water is covered with a sheet of cardboard and the glass is inverted the ambient air pressure will hold the cardboard against the bottom of the glass and prevent leakage out of the glass. If the ambient pressure is considered as zero pounds per square inch gauge the pressure inside the inverted glass at any point will be less than zero.

Figure 1:
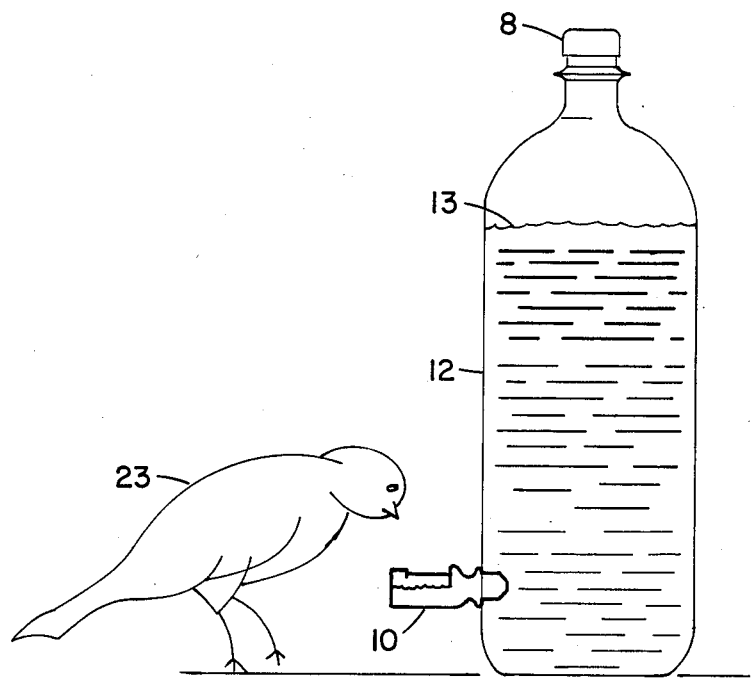
FIG. 1 is a schematic elevational view of the apparatus in accordance with one form of the invention.
Figure 3:
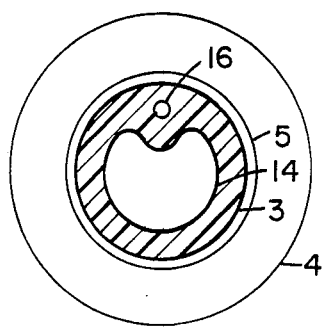
FIG. 3 is a sectional view taken along the line II—II of FIG. 2.
Figure 2:
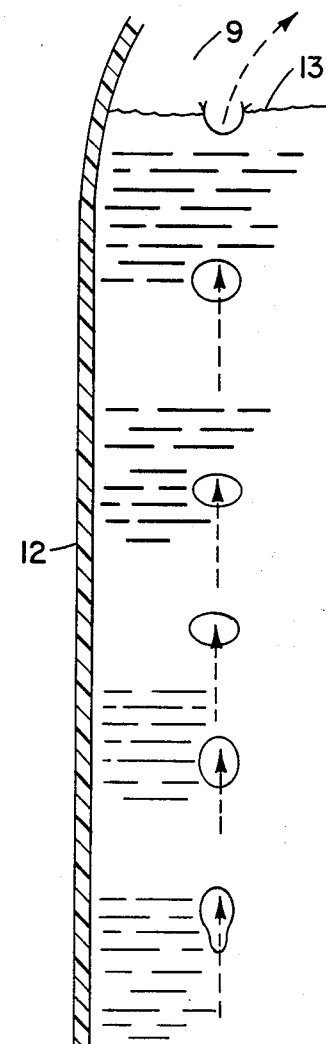
FIG. 2 is a partially schematic elevational view of the apparatus in accordance with one form of the invention.
Figure 2:
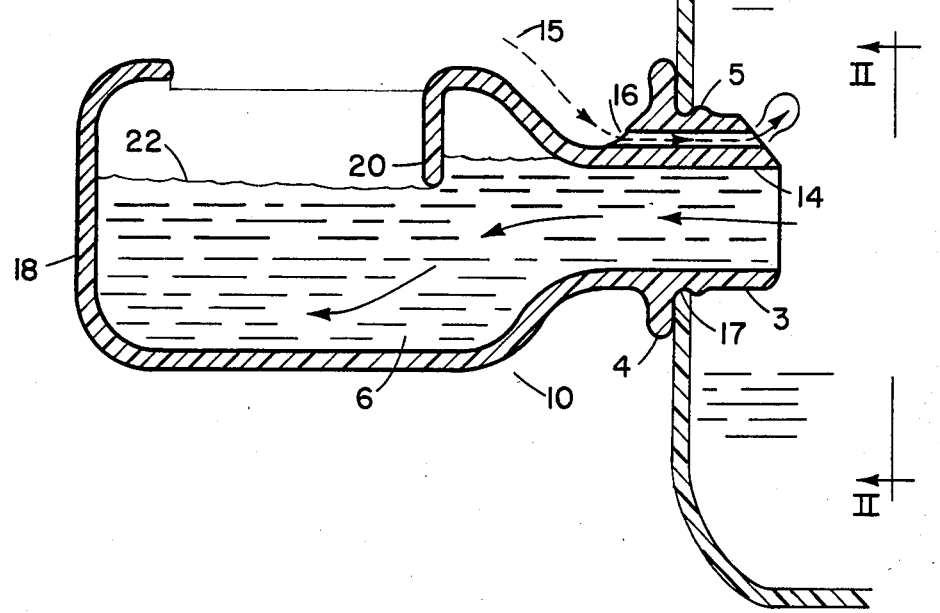

Referring now to FIGS. 1, 2, and 3, there is shown a watering apparatus 10 in accordance with one form of the invention which cooperates with a reservoir 12. The reservoir 12 may be any suitable empty container such as a disposable plastic two-liter beverage container with tight-fitting cap. A small hole 17 is made above the base of the container (approximately ⅜" or larger diameter) into which the watering apparatus 10 extends. A nozzle 3 of the watering apparatus 10 is merely inserted into the container after cutting the hole 17. A circular rib 5 disposed on the periphery of the nozzle 3 aids in retaining the watering apparatus 10 engaged with the reservoir or container 12. A seal 4 provides a positive seal between the watering apparatus 10 and the reservoir 12.

The watering apparatus 10 includes a first fluid conduit 14 extending in a generally horizontal direction from the side of the reservoir 12. Disposed at a higher elevation is a second fluid conduit 16 which is also generally horizontally oriented. The second fluid conduit 16 extends from the interior of the reservoir 12 to ambient. The first fluid conduit 14 extends from the interior of the reservoir 12 into a chamber 18 having an open upper face, which has the lowermost extremity disposed beneath the lowest elevation of the first fluid conduit 14 and the highest elevation extending above the highest elevation of the first fluid conduit 14. Depending from the open upper face of the concave chamber 18 is a barrier member or seal 20. The seal 20 may extend in a plane perpendicular to the view of FIG. 2, where it extends from one side of the concave chamber 18 to the other side. Alternatively, the seal 20 may depend from the entire circumferential extent of the open face of the concave chamber 18. The seal 20 prevents flow of liquid out of the reservoir 12 via the first fluid conduit 14 after the level in the chamber 18 reaches the lowermost extremity of the seal 20. In a typical construction the second fluid conduit 16 will have a diameter of approximately B 1/16 inch and the first fluid conduit 14 will have a diameter of approximately ⅜ inch.

During initial operation the reservoir 12 is filled with water 13 and capped 8 tightly. Alternatively, the reservoir 12 may also be filled through the concave chamber 18 by tilting the entire assembly. The water 13 will flow from the reservoir 12 into the concave chamber 18 until the level reaches the lowest elevation of the barrier member or seal 20 which constitutes a partial seal. A vacuum seal or lock is then established wherein no further water 13 enters the concave chamber 18.

As the water 13 is consumed from the concave chamber 18, as when a bird 23 or other creature drinks or when the water 13 is demanded by a plant, the water 13 level goes below the lowest extent of the barrier member or seal 20. The water 13 then flows from the reservoir 12 and through the first fluid conduit 14 and into the concave chamber 18. A volume of air 15 equal to the volume of water 13 released from the first fluid conduit 14 enters the reservoir 12 through the second fluid conduit 16, which may merely be a hole. The second fluid conduit 16 must be disposed at a higher elevation than the first fluid conduit 14. Normal expansion and contraction caused by temperature changes and the like will alter the water 13 level in the concave chamber 18. When the reservoir 12 is empty, it may be refilled in the same manner as described above. When the reservoir 12 becomes dirty, it may be removed and replaced.

The watering apparatus 10 is a simple, portable attachment that can be inserted into a normally disposable plastic container 12, such as a two-liter beverage bottle, to provide clean, safe drinking water 13 for birds. Although the embodiment described is intended specifically for use with small birds, other larger embodiments of the invention are suitable to provide water 13 for even large animals. The device is inexpensive and easy to use. Excess evaporation does not occur because the surface area of the water 13 exposed to the outside air 15 (the water 13 disposed in the concave chamber 18) is relatively small. Therefore, the large reservoir 12 of the water 13 in the container provides an adequate supply of fresh water 13 over an extended period of time. Pet owners can confidently leave their animals unattended for a much longer period of time knowing they will have a continuing supply of fresh water 13. In addition, bird lovers can be assured that song birds will always have a source of water 13.

The principle of operation is based upon the pressure relationship between air and vapor pressure inside 9 the reservoir 12 and outside in the air 15. The barrier member or seal 20 limits the water 13 level in the concave chamber 18. The second fluid conduit 16 allows the air 15 to enter the reservoir 12, to replace an equal volume of the water 13 leaving the reservoir 12. The surface tension of the water 13 and the pressure relationships prevent the water 13 from leaving the reservoir 12 via the second fluid conduit 16. More specifically, the pressure within the exposed water 13 surface at the second fluid conduit 16 will be negative relative to the ambient air 15 pressure. A horizontal line 12 extending through the first fluid conduit 14 and touching the lowermost extremity of the barrier member or seal 20 defines an elevation at which the pressure is zero gauge pressure. Below the line 22, the pressure in the concave chamber 18 as well as in the reservoir 12 is positive. Above the line 22, the pressure in the reservoir 12 is negative gauge pressure. Ordinarily, the water 13 will not rise above this line 22 because of the effect of the member 20. Slight variations will occur from expansion and contraction due to temperature changes.

Advantages of the new watering apparatus 10 are that it is low cost and can be manufactured inexpensively in large quantities. The invention is simple and easy to use and can be used over and over with other containers. Embodiments of the invention are unlimited in size, shape and volume and can be used for supplying water to hummingbirds as well as to large animals such as elephants. The invention may be used with plastic bottles, cartons and containers which are normally discarded. The watering apparatus 10 may be easily cleaned. There are no moving parts to wear out. Water loss due to evaporation is minimal and, thus, the apparatus provides for a long lasting water supply. If the reservoir 12 is transparent or translucent, it can easily be checked for cleanliness and volume level. The watering apparatus 10 allows for a predetermined amount of expansion and contraction without loss of water.

The watering apparatus 10 may be easily adapted for the addition of chemicals or food supplements to provide additional nourishment, for example, hummingbird feed. It enhances the survival of many bird species by allowing humans to provide an abundant source of safe, clean drinking water at various locations and levels. For example, the apparatus may be suspended from a tree.

The invention has been described with reference to its illustrated preferred embodiment. Persons skilled in the art of constructing watering devices may, upon exposure to the teachings herein, conceive variations in the mechanical development of the components therein. Such variations are deemed to be encompassed by the disclosure, the invention being delimited only by the appended claims.

Having thus described my invention, I claim:

1. A liquid dispensing apparatus for insertion into an opening in an associated liquid reservoir, which comprises:
    a module which includes a first fluid conduit extending into said associated liquid reservoir;
    a second fluid conduit being disposed in said module at a higher elevation than said first fluid conduit, said second fluid conduit extending into said associated liquid reservoir and extending to the atmosphere surrounding said module;
    a concave chamber in said module having an open upper face disposed in fluid communication with said first fluid conduit, said concave chamber including means for limiting flow out of said first fluid conduit, said means being fixed to and immovable with respect to said concave chamber; and
    sealing means for sealing said module to the associated liquid reservoir.

2. The apparatus as described in claim 1, wherein:
    said first fluid conduit extends from the associated liquid reservoir to said concave chamber having an open upper face, said open upper face being disposed at a higher elevation than the highest elevation of said second fluid conduit.

3. The apparatus as described in claim 2, wherein:
    said means for limiting flow is a depending member extending from the periphery of said concave chamber into the interior of said concave chamber.

4. The apparatus as described in claim 3, wherein:
    said concave chamber extends to an elevation lower than the highest elevation of said first fluid conduit.

5. The apparatus as described in claim 4, wherein:
    said concave chamber extends to an elevation higher than the highest elevation of said second fluid conduit.

6. The apparatus as described in claim 5, wherein:
    the elevation of the lowest extremity of said depending member is intermediate the highest elevation of said first fluid conduit and the lowest elevation of said first fluid conduit.

* * * * *